US006995203B2

(12) United States Patent

Ryang et al.

(10) Patent No.: US 6,995,203 B2

(45) Date of Patent: Feb. 7, 2006

(54) FLAME RETARDANT POLYMER COMPOSITIONS

(75) Inventors: Hong-Son Ryang, Camarillo, CA (US); Ten-Luen Liao, South Pasadena, CA (US)

(73) Assignee: The Boeing Company, Chicago, IL (US)

( * ) Notice: Subject to any disclaimer, the term of this patent is extended or adjusted under 35 U.S.C. 154(b) by 161 days.

(21) Appl. No.: 10/651,629

(22) Filed: Aug. 29, 2003

(65) Prior Publication Data

US 2005/0049338 A1 Mar. 3, 2005

(51) Int. Cl.

| | |
|---|---|
| ***C08K 5/098*** | (2006.01) |
| ***C08K 3/28*** | (2006.01) |
| ***C08J 9/00*** | (2006.01) |

(52) U.S. Cl. ...................... 524/398; 524/399; 524/400; 524/429; 521/85; 521/89; 521/94; 521/98

(58) Field of Classification Search ........ 524/398–400, 524/569, 429; 521/85, 89, 94, 98

See application file for complete search history.

(56) References Cited

U.S. PATENT DOCUMENTS

| | | | | |
|---|---|---|---|---|
| 3,941,908 A * | 3/1976 | Valia et al. | ................. | 428/379 |
| 4,098,748 A * | 7/1978 | Moore et al. | ............... | 523/200 |
| 5,780,525 A | 7/1998 | Ryang et al. | | |
| 5,962,608 A | 10/1999 | Ryang et al. | | |
| 6,169,119 B1 | 1/2001 | Ryang et al. | | |
| 6,197,415 B1 | 3/2001 | Holman | | |

* cited by examiner

*Primary Examiner*—Peter Szekely

(74) *Attorney, Agent, or Firm*—Ingrassia Fisher & Lorenz, P.C.

(57) ABSTRACT

A fire retardant polymer composition is provided. The fire retardant polymer composition is formed of a polymer material, a plurality of monomers of a polycondensed partially hydrolyzed chelated metal oxide precursor, and at least one flame retardant constituent.

A process for making a flame retardant polymer composition is also presented. The process includes contacting a polymer material with a metal oxide sol comprising a liquid and a condensation product of a partially hydrolyzed chelated metal oxide precursor to form a mixture. The polymer material also is contacted with at least one flame retardant constituent. The polymer material is then polymerized or solidified.

27 Claims, No Drawings

FLAME RETARDANT POLYMER COMPOSITIONS

TECHNICAL FIELD

The present invention generally relates to polymer compositions, and more particularly relates to polymer compositions exhibiting flame retardant properties.

BACKGROUND

Flame retardant polymer materials are desirable for many applications, including the aeronautics and aerospace industries, the automotive industry, and the residential and commercial construction industries. Polymer materials that exhibit flame retardant properties may be used to manufacture products such as aircraft and aerospace insulation, aircraft parts, fire-retardant automobiles and automobile parts, housing and building materials, home interior products, clothing and other household products.

A known approach for improving the flame retardant properties of polymers includes the addition to the polymers of additives that are known to increase the fire resistance of the polymers. Some additives, such as those containing halogen, phosphorous and nitrogen, although effective in meeting some standards of flame retardancy, may generate highly toxic gases during combustion. When present in large amounts, often necessary in typical polymer compositions to be effective, these additives may present significant environmental hazards. Other additives, such as metal oxides and/or hydroxides containing aluminum, magnesium, zirconium, tin, molybdenum, and bismuth, tend to aggregate in a polymer matrix forming heterogeneous mixtures. These additives are not suitable for spray applications due to the heterogeneous nature of the mixtures, which may result in precipitation during storage and nozzle clogging during spraying.

Accordingly, it is desirable to provide an improved homogeneous fire retardant polymer composition. In addition, it is desirable to provide a fire retardant polymer composition exhibiting controlled combustion. It is further desirable to provide a fire retardant polymer composition containing a reduced amount of fire retardant additives. In addition, it is desirable to provide a fire retardant polymer composition suitable for spray-on applications. It is also desirable to provide a flame retardant polymer composition that reduces environmental hazards. It is further desirable to provide a process for making a homogeneous fire retardant polymer composition. Furthermore, other desirable features and characteristics of the present invention will become apparent from the subsequent detailed description and the appended claims, taken in conjunction with the accompanying drawings and the foregoing technical field and background.

BRIEF SUMMARY

According to an exemplary embodiment of the present invention, there is provided a fire retardant polymer composition. The fire retardant polymer composition comprises a polymer material, a plurality of monomers of a polycondensed partially hydrolyzed chelated metal oxide precursor, and at least one flame retardant constituent.

According to another exemplary embodiment of the present invention, there is provided a process for making a flame retardant polymer composition. The process comprises the steps of contacting a polymer material with a metal oxide sol comprising a liquid and a condensation product of a partially hydrolyzed chelated metal oxide precursor, and with at least one flame retardant constituent. The process further comprises at least one of polymerizing and solidifying the polymer material.

According to a further exemplary embodiment of the present invention, there is provided a fire retardant polymer foam composition. The fire retardant polymer composition comprises a polymer material, a plurality of monomers of a polycondensed partially hydrolyzed chelated metal oxide precursor, a flame retardant constituent and a blowing agent.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The various embodiments of the present invention relate to the fabrication of a homogeneous fire retardant polymer composition. The homogeneous fire retardant polymer composition may be made using a polymer material, a stable metal oxide sol, and at least one fire retardant constituent. A "sol", as the term is used herein, refers to a composition comprising a liquid colloidal dispersion containing a liquid phase and a dispersed phase. Use of the metal oxide sol of the various embodiments of the present invention results in nano-sized particles comprising the dispersed phase of the sol that are uniformly distributed throughout the polymer composition. Without being bound by theory, it is believed that the dispersed phase of the metal oxide sol forms a synergistic relationship with the flame retardant constituent, thus enhancing the flame retardant properties of the polymer composition while reducing the amount of flame retardant constituent that would otherwise be needed if the metal oxide sol were not used.

As used herein, the term "polymer material" of the various embodiments of the present invention may comprise any conventional polymer or polymer precursor. The polymer material may be any material that comprises or is capable of forming a pre-polymer material, a partially polymerized material or a polymer. The polymer material may be monomers, a B-staged polymer, or a polymer. In one exemplary embodiment of the present invention, the polymer material may be a curable resin, including a light or UV curable resin, such as acrylics, methacrylates, and unsaturated polyesters. In another exemplary embodiment of the present invention, the polymer material is at least one thermosetting resin that can be cured by means of external energy such as heat, light or electron beam to form at least a partially three dimensional cured product. In another embodiment, the polymer material is at least one thermoplastic resin that can solidified after transformation into a liquid or partially liquid state. In yet another embodiment, the polymer material is a mixture containing at least one thermoplastic resin and at least one thermosetting resin.

In another exemplary embodiment of the present invention, the polymer material is at least one of an acrylic, an unsaturated polyester, a saturated polyester, an alkyd, a vinyl ester, a polyurethane, an epoxy, a phenol, an urea-aldehyde, a polyvinyl aromatic, a maleimide, a polyvinyl halide, a polyolefin, a polyorganosiloxane, an amino resin, a polyamide, a polyimide, a polyetherimide, a polyphenylene sulfide, an aromatic polysulfone, a polyamideimide, a polyesterimide, a polyesteramideimide, a polyvinyl acetal, a fluorinated polymer, a polycarbonate and the like. A description of the above polymer materials can be found in U.S. Pat. No. 5,962,608, issued Oct. 5, 1999 to Ryang et al., the entirety of which is incorporated herein by reference.

In a preferred embodiment of the invention, the polymer material comprises at least polyurethane. Polyurethanes are well known in the polymer arts. Polyurethanes can be prepared by reacting polyfunctional hydroxy compounds, such as glycols, polyols and hydroxy-terminated polyesters and polyethers, with polyfunctional aliphatic or aromatic isocyanates. Aliphatic or aromatic polyurethanes can be utilized.

As described above, the various embodiments of the present invention utilize a stable metal oxide sol to fabricate a homogeneous fire retardant polymer composition. The liquid phase of the metal oxide sol may be aqueous and/or organic, and in particular, may be at least one of water and organic liquids such as alcohols, glycols and other protic organic solvents. Organic solvents include, but are not limited to, methanol, ethanol, propanol, isopropanol, sec-butanol, t-butanol, methoxyethanol, ethoxyethoxyethanol, ethylene glycol and propylene glycol. The liquid phase also may be a liquid or partially liquid substance to which a metal oxide sol can be added, such as resin monomers. For example, in the case where it is desired to incorporate metal oxide sols into a curable resin, the liquid phase of the metal oxide sols may comprise one embodiment of a polymer material such as curable resin monomers in liquid form.

The dispersed phase of the liquid colloidal dispersion comprises condensed partially hydrolyzed chelated metal oxide precursors. The condensed partially hydrolyzed chelated metal oxide precursors are nano-sized clusters ("nano-clusters") that generally have an amorphous shape, although in some embodiments a somewhat symmetrical shape is obtained.

In one embodiment, the condensed partially hydrolyzed chelated metal oxide precursors have an average size (the size is the average diameter of a nano-cluster) of less than about 10 nm, preferably less than about 5nm, and more preferably less than about 2 nm. It will be appreciated that some nano-clusters have a size larger than about 10 nm, as the average size refers to calculating the average of a random sample of nano-cluster diameters, each diameter to be averaged itself representing the average diameter of a generally amorphous nano-cluster in the random sample. The average size of a nano-cluster can be preferably determined with a transmission electron microscope, although an atomic force microscope can also be useful.

In general, a metal oxide sol can be produced by contacting a metal oxide precursor with one or more multifunctional compounds. The multifunctional compound contains at least one reactable functional group and at least one chelating functional group. The chelating functional group of the multifunctional compound coordinates with the metal oxide precursor to form a chelated metal oxide precursor. The chelated metal oxide precursor is hydrolyzed by a hydrolyzing agent, for example, by contact with water, to provide a metal oxide sol.

Suitable metal oxide precursors are capable of being converted to a chelated metal oxide precursor by contact with a compound containing a chelating group. Metal oxide precursors include metal organic compounds and inorganic salts. Metal organic compounds include metal alkoxides and metal carboxylates. Metal alkoxides and metal carboxylates include metal methoxides, metal ethoxides, metal isopropoxides, metal propoxides, metal butoxides, metal ethylhexoxides, metal (triethanoloaminato)isopropoxides, metal bis (ammonium lacto)dihydroxides, metal bis(ethyl acetoacetato)diisopropoxides, metal bis(2,4-pentanedionate) diisopropoxides, metal acetates, metal ethylhexanoates, metal gluconates, metal oxalates, metal propionates, metal pantothenates, metal cyclohexanebutyrates, metal trifluoroacetylacetonates, metal citrates, and metal methacrylates. Inorganic salts include metal halides and metal nitrates.

The metal of the metal oxide precursors include transition metals, alkaline earth metals and metallic elements of Groups 3A, 4A and 5A of the periodic table of elements, and combinations thereof. Transition metals include Sc, Ti, V, Cr, Mn, Fe, Co, Ni, Cu, Zn, Y, Zr, Nb, Mo, Tc, Ru, Th, Pd, Ag, Cd, Ba, La, Hf, Ta, W, Re, Os, Ir, Pt, Au, Hg and Ac. Alkaline earth metals include Be, Mg, Ca, Sr and Ba. Group 3A metallic elements include B, Al, Ga, In and Tl. Group 4A metallic elements include Ge, Sn and Pb. Group 5A metallic elements include As, Sb and Bi. In a preferred embodiment of the invention, the metal of the metal oxide precursors is at least one of aluminum, antimony, bismuth, calcium, chromium, magnesium, tin, titanium, zinc, and zirconium.

Metal oxide precursors include at least one of transition metal alkoxides, alkali metal alkoxides, alkaline earth metal alkoxides, Groups 3A, 4A and 5A alkoxides, transition metal carboxylates, alkaline earth metal carboxylates, Groups 3A, 4A and 5A carboxylates, transition metal halides, alkaline earth metal halides, Groups 3A, 4A and 5A halides, transition metal nitrates, alkaline earth metal nitrates and Groups 3A, 4A and 5A nitrates. Preferred metal oxide precursors include metal organic compounds and inorganic salts of Groups 3A and 4B of the periodic table of elements such as aluminum alkoxide, aluminum halides, antimony alkoxides, bismuth alkoxides, titanium alkoxides, titanium halides, zirconium alkoxides, and zirconium halides. It will be appreciated, however, that the metal oxide precursor may be selected for optimum compatibility with the polymer material selected to form the fire retardant polymer composition of the present invention.

Specific examples of metal oxide precursors include aluminum triethoxide, aluminum isopropoxide, aluminum sec-butoxide, aluminum tri-t-butoxide, aluminum lactate, aluminum nitrate, aluminum chloride, aluminum bromide, antimony butoxide, antimony ethoxide, bismuth t-pentoxide, calcium ethylhexanoate, calcium methoxyethoxide, magnesium methoxide, magnesium ethoxide, tin bis(acetylacetonate)dibromide, tin bis(acetylacetonate)dichloride, titanium methoxide, titanium ethoxide, titanium isopropoxide, tin ethoxide tin methoxide, titanium propoxide, titanium butoxide, titanium ethylhexoxide, titanium (triethanolaminoto)isopropoxide, titanium bis(ammonium lacto)dihydroxide, titanium bis(ethyl acetoacetato)diisopropoxide, titanium bis(2,4-pentanedionate)diisopropoxide, titanium chloride, titanium bromide, zinc methoxyethoxide, zirconium ethoxide, zirconium isopropoxide, zirconium propoxide, zirconium sec-butoxide, zirconium t-butoxide, zirconium chloride, zirconium bromide, and combinations of two or more of the above compounds.

The multifunctional compound is any compound capable of coordinating to a metal oxide precursor through a chelating functional group. The multifunctional compound, which is contacted with the metal oxide precursors, contains at least one reactable functional group and at least one chelating functional group. The chelating functional groups generally coordinate through nitrogen, oxygen, sulfur, phosphorus, arsenic and/or selenium atoms; thus chelating functional groups contain at least one of N, O, S, P, As and Se atoms. Chelating functional groups include polyphosphates, β-diketones, acetal acetates, aminocarboxylic acids, hydroxycarboxylic acids, hydroxyquinolines, polyamines, aminoalcohols, aromatic heterocyclic bases, phenols, aminophenols, oximes, phophonic acids, Schiff bases, tetrapyrroles, thiols, xanthates, and salicylic acid. The chelating functional groups coordinate to (react with) the metal of the metal oxide precursor in such a way to form a coordinated or chelated metal oxide complex that can prevent gelation of the sol by retarding, preventing or partially preventing hydrolysis and/or condensation.

The reactable functional group of the multifunctional compound does not substantially interact or bond with the metal oxide precursor. Instead, the reactable functional group interacts with a polymerizable material with which the metal oxide sols are subsequently combined. In other words, the reactable functional group is capable of reacting, interacting or bonding with a polymer material, a polymerizable material, or polymer substituent. The reactable functional group may be incorporated into the polymer backbone during polymerization, may be incorporated into the polymer during crosslinking, and/or may be incorporated into the polymer by reacting with a side chain, substituent group or a functional group on the polymer. For example, reactable functional groups include curable functional groups, photoreactive functional groups, thermocurable groups, interactable groups, solvateable groups and condensable groups. Reactable functional groups include an acrylic unsaturated bond and other radiation curable aliphatically unsaturated functional groups, such as vinyl and acrylamide groups, styryl, acrylic, hydroxy, amine, carboxylic, thio and phenol groups. Reactable functional groups can ensure good compatibility of the metal oxide sol with the polymerizable material with which the metal oxide sols are subsequently combined. The resulting combination of the metal oxide sol and the polymer material provides a polymer nano-composite in which the partially hydrolyzed chelated metal oxide precursor is uniformly distributed in the resultant polymer at a molecular level.

In a few embodiments, especially when a relatively small amount or equivalents of the multifunctional compound (compared to the metal oxide precursor) is used, the reactable functional group may initially chelate with the metal oxide precursor; but once the partially hydrolyzed chelated metal oxide precursor or the nano-clusters are combined with the polymer material, the reactable functional group reacts, interacts or bonds with the polymerizable material.

Multifunctional compounds are commercially available and/or can be prepared by reacting a compound containing a chelating functional group with a compound containing a chelating functional group. Specific multifunctional compounds that can be used in accordance with the present invention include alkoxylated diamines, aminoalkylphosphonic acid, amino tris(methylene phosphonic acid), citric acid, diethylenetriamine pentaacetic acid, ethylenediaminetetraacetic acid, gluconic acid, glucoheptonoic acid, hexamethylenediamine tetra(methylene phosphonic acid), 2-(methacryloyloxy)ethyl acetoacetate, 5-(methacryloyloxy)methyl salicylic acid, 4-methacryloylamino salicylic acid, hydroxyethyl salicylate, hydroxyethyl salicylamide, 2-(2-hydroxy ethoxy) phenol, o-hydroxybenzoylacetone, 5-hydroxy-2-(hydroxymethyl)-4H-pyran-4-one, N-hydroxyethylenediaminetriacetic acid, hydroxyethylidene diphosphonic acid, hydroxyethane diphosphonic acid, nitrilotriacetic acid, sorbitol, tolyltrizole, o-hydroxybenzoylacetone, 2-hydroxydibensoylmethane and N-(acetoacetyl) glycine.

Supplemental multifunctional compounds, which contain at least one of a reactable functional group and a chelating functional group, can optionally be used in addition to the multifunctional compound. Supplemental multifunctional compounds include any of the above-listed multifunctional compounds and may also include acetylacetone, poly(ethylene glycol) methacrylate, poly(propylene glycol) methacrylate, salicylic acid, 3-hydroxy-2-methyl-4-pyrone, and 8-hydroxyquinolone. Supplemental multifunctional compounds are contacted with the metal oxide precursor just before, at the same time, or just after the multifunctional compound and the metal oxide precursor are combined.

The metal oxide sol can be prepared in accordance with the following procedure. A metal oxide precursor is contacted with at least one multifunctional compound. In a preferred embodiment, the metal oxide precursor is provided in an appropriate amount of solvent, preferably in an organic solvent such as an alcohol or glycol solvent. In another embodiment, the metal oxide precursor is provided in the polymer material in which the subsequently formed metal oxide sol will be incorporated. For example, if the metal oxide sols are to be incorporated into a curable resin system, the metal oxide precursor can be provided in the monomers of the uncured resin.

The metal oxide precursor is contacted with a multifunctional compound at a temperature suitable to permit the multifunctional compound to coordinate with the metal oxide precursor. In one embodiment, the temperature is from about 0° to about 50° C., but preferably about 15° to 35° C. It is important to ensure that the chelating functional group of the multifunctional compound coordinates with the metal oxide precursor prior to partial hydrolyzation with a hydrolyzing agent such as water.

Subsequent to treatment with the chelating compound, the chelated metal oxide precursor is partially hydrolyzed by contact with a hydrolyzing agent. That is, unchelated atoms, groups or sites that are directly or indirectly connected to the metal atom of the chelated metal oxide precursor are hydrolyzed thereby providing a monomer of a partially hydrolyzed chelated metal oxide precursor. The chelated atoms or groups are generally not hydrolyzed, although a small fraction of the chelated groups may be hydrolyzed in some instances. In one embodiment, the temperature at which the chelated metal oxide precursor is partially hydrolyzed is from about 0° to about 50° C., but preferably about room temperature.

Partial hydrolysis may be carried out by contacting the chelated metal oxide precursor with a hydrolyzing agent such as water, and preferably deionized water. The hydrolyzing agent converts the unchelated atoms or groups to hydroxyl groups. In one embodiment the molar ratio of the chelated metal oxide precursor to water is about 1:0.5 to about 1:3. In another embodiment, the chelated metal oxide precursor is contacted with a hydrolyzing agent in a solvent and preferably an organic solvent. In a further embodiment, the chelated metal oxide precursor is contacted with a hydrolyzing agent in resin monomers and/or other ingredients. In this connection, the metal oxide sols can also be prepared in resin monomers without a solvent, or in the absence of a non-reactive element, such as a non-reactive diluent.

The partially hydrolyzed chelated metal oxide precursors are reactive monomers. Once formed, the monomers of the partially hydrolyzed chelated metal oxide precursor proceed to form the metal oxide sol of the invention by limited polycondensation. Since the monomers are partially chelated, the polycondensation is controlled whereby nano-clusters of several monomers are formed. That is, since polycondensation is controlled, the nano-clusters do not agglomerate and/or aggregate into gel form. Polycondensation may be controlled by varying the amount of hydrolyzing agent used and varying the percentage of chelated sites on the metal oxide precursor molecule. The resultant metal oxide sols are stable. Once made, the metal oxide sols can be stored as a colloidal dispersion for an extended period of time. It is believed that this is because the nano-clusters tend not to agglomerate.

The metal oxide sol, and particularly the nano-clusters, may be combined with a polymer material up to about 70% by weight of the total composition. In one preferable embodiment, at least about 0.1% by weight of the total composition is the metal oxide sol, and more preferably from about 0.5% to about 40% by weight of the total composition is a metal oxide sol. In a further embodiment of the invention, the total metal concentration is in the range of from 0.01 wt. % to 10 wt. % of the total flame retardant composition. In a preferred embodiment of the invention, the total metal concentration is in the range of from 0.1 wt. % to 5 wt. % of the total flame retardant composition. The amount of metal oxide sol used with a particular polymer material is determined by processability and performance of the prepolymer mixture and the resultant polymer made with the metal oxide sol by viscosity requirements, by mechanical, electrical and thermal properties, and by other concerns. The maximum amount used may be determined, however, in a practical respect by the desired mechanical and chemical parameters of the resultant polymer. In one embodiment, the amount of polymer material that may be combined with a metal oxide sol to make a prepolymer mixture is from about 30% to about 99.9% by weight. In another embodiment, the amount of polymerizable material that may be combined with a metal oxide sol to make a prepolymer mixture is from about 60% to about 99.5% by weight.

As described above, the various embodiments of the present invention also utilize at least one flame retardant constituent. Suitable flame retardant constituents that are commercially available may be used. Preferably, the flame retardant is one suitable for a particular application and compatible with the other components of an embodiment of the flame retardant polymer composition of the present invention. The selection of the flame retardant for any particular application varies on the balance of physical properties, appearance and cost of the end product formed. Suitable flame retardants for use in the various embodiments of the flame retardant polymer composition include, but are not limited to, halogen-based, phosphorous-based, nitrogen-based and sulfur-based flame retardant compositions. These compositions include brominated diphenyl oxides, chlorinated phosphate ester, triaryl phosphate esters, sodium antimonates and other suitable flame retardant compositions. Examples of commercially available flame retardants suitable for use in various embodiments of the flame retardant polymer composition of the present invention include those sold under the trademark Fyrol® by Akzo Nobel Functional Chemicals LLC of Dobbs Ferry, N.Y., such as Fyrol® PCT (tri(2-chloroisopropyl) phosphate) and Fyrol® 6 (diethyl-N, N-bis(2-hydroxy ethyl) aminomethyl phosphate) and those sold by Great Lakes Chemical Corp. of Indianapolis, Ind., including PHT4-Diol (tetrabromophthalate diol) and flame retardants sold under the Fyrebloc® trademark, such as Fyrebloc® 7DB-301 (a proprietary blend).

Without being bound by theory, it is believed that, when combined with a polymer material to form a flame retardant polymer composition, the dispersed phase of the metal oxide sol forms a synergistic relationship with the flame retardant constituent(s), thus enhancing the flame retardant properties of the polymer composition and reducing the amount of flame retardant constituent that would otherwise be needed if the metal oxide sol were not used. It is hypothesized that because the average surface-to-volume ratio of the metal oxide sol nano-clusters is sufficiently small relative to the polymer monomers, the nano-clusters may be uniformly dispersed throughout the polymer material without excessive agglomeration. Accordingly, the nano-clusters mix with the polymer material in which they are incorporated to give a homogeneous flame retardant composition that is transparent in appearance. It is further hypothesized that the molecules of the flame retardant constituent(s) associate or coordinate with the nano-clusters of the metal oxide sol and, thus, are highly dispersed throughout the polymer composition and do not agglomerate. Accordingly, the flame retardant constituent(s) is more effective in the polymer composition than if the metal oxide sol were not used and less of the flame retardant constituent(s) is needed to achieve desired flame retardancy criteria. The homogeneous nature of the composition resulting in reduced agglomeration of the flame retardant constituent(s) also may make the composition suitable for spray applications. Further, the homogeneous nature of the flame retardant polymer composition of the present invention may result in effectively controlled polymer combustion. With a reduced amount of flame retardant constituent(s) needed for effective flame retardancy, danger from toxic gases released during combustion may be significantly reduced.

In another embodiment of the present invention, other ingredients may be added to the polymer composition prior to or after polymerization and/or solidifying. Other ingredients include blowing agents, fibrous reinforcing materials, pigments, mold release agents, thermoplastic and elastomeric polymeric materials, shrink control agents, wetting agents, antifoam agents, surface treatment agents, and thickeners.

In various embodiments for making the flame retardant polymer composition of the present invention, the metal oxide sol is simply combined with a polymer material and the flame retardant constituent(s), and optionally various other ingredients, to form a prepolymer mixture. The prepolymer mixture is then polymerized, cure heated or cooled to form the polymer compositions of the present invention. In embodiments involving a thermosetting resin, the metal oxide sol and flame retardant constituent(s) are combined with the thermosetting resin prior to curing. The prepolymer mixture of the thermosetting resin, the metal oxide sol and the flame retardant constituent(s) is preferably mixed followed by curing (polymerization and/or crosslinking). In some embodiments, the thermosetting resin can be B-staged (partially cured) before it is combined with the metal oxide sol and/or flame retardant constituent(s) to form a prepolymer mixture. Curing is accomplished in any manner consistent with the particular characteristics of the thermosetting resin. For example, curing may be initiated by light such as UV light or visible light, a change in temperature such as heating or cooling, exposure to a curing initiator such as oxygen, or any other means known to those skilled in the art.

In any of these embodiments, the liquid phase of the metal oxide sol can be removed from a prepolymer mixture prior to curing. In another embodiment, the liquid phase of the metal oxide sol can be removed before mixing the sol with the polymer material. In yet another embodiment, the liquid phase of the metal oxide sol may be removed subsequent to curing, polymerization or heating the prepolymer mixture.

In embodiments where the polymer material is a thermoplastic resin, the metal oxide sol and flame retardant constituent(s) are combined with the thermoplastic resin prior to polymerization or after polymerization of the resin but when the thermoplastic resin is in condition to be combined with the metal oxide sol and flame retardant constituent(s) to form a prepolymer mixture. For example, in embodiments where a thermoplastic resin is polymerized, the metal oxide sol and flame retardant constituent(s) are combined with the resin after the thermoplastic resin is heated so that it is in the molten state or the liquid state. In this embodiment, the polymer composition according to the present invention is made by simply cooling/solidifying the prepolymer mixture of the molten or liquid thermoplastic resin, the metal oxide sol and the flame retardant constituent(s). In another embodiment, the metal oxide sol and the flame retardant constituent(s) are combined with the thermoplastic resin (prior to polymerization) to form a prepolymer mixture and then the prepolymer mixture is polymerized to form the polymer composition of the present invention. In any of these embodiments, the liquid phase of the metal oxide sol may be removed prior to polymerization, heating and/or cooling (such as by evaporation), prior to combining the metal oxide sol, the flame retardant constituent, and thermoplastic resin, or after polymerization, heating and/or cooling.

The prepolymer mixtures containing the polymer materials, the nano-clusters (made with metal oxide sols) and the flame retardant constituent(s) may be processed using conventional techniques associated with processing the polymer material. For example, when the prepolymer mixture is a particular curable resin system, the prepolymer mixture is cured and processed in a conventional manner associated with the particular curable resin system.

The following example illustrates a method, in accordance with one embodiment of the invention, for making a flame retardant polymer composition of the present invention, in particular, a flame retardant polyurethane foam composition. As a first step, the metal oxide sol may be formed. Titanium isopropoxide, a metal oxide precursor, is added to methoxyethanol and mixed for approximately twenty minutes. Any convenient method of mixing may be used to formulate the flame retardant polymer composition of the present invention, such as, for example, rapid stirring with a mechanical stirrer or agitation with a mechanical agitator. Acetylacetone, 5,7-dibromo-8-hydroxyquinoline and 2-(2-hydroxy ethoxy) phenol, which serve as multifunctional compounds, are added to the methoxyethanol mixture and mixed for about one hour at a temperature in the range of 40-50° C. Vinyltrimethoxysilane and phenyltrimethoxysilane, which serve to increase the total inorganic oxide percentage in the polymer composition, optionally may be added to the methoxyethanol mixture and mixed to obtain a homogeneous solution. Dionized water is added to the mixture to hydrolyze the chelated metal oxide precursor and complete production of the metal oxide sol.

The metal oxide sol may then be mixed with FE1025.66 NFR, a polymer precursor by Foam Enterprises, Inc. of Minneapolis, Minn., and then the volatile materials may be removed from the mixture at a temperature of approximately 40° C. using a vacuum pump. It will be appreciated that, in another embodiment of the invention, the volatile materials may be removed from the metal oxide sol before the metal oxide sol is mixed with the polymer precursor.

In an exemplary embodiment of the flame retardant polymer composition of the present invention, the polymer precursor/metal oxide sol mixture, the formation of which is described above, may have the following composition, with each of the components set forth in weight percent of the total polymer precursor/metal oxide sol mixture:

| Component | wt. % |
|---|---|
| Titanium isopropoxide | 20.0% |
| 2-2(hydroxy ethoxy) phenol | 1.0% |
| vinyltrimethoxysilane | 3.7% |
| phenyltrimethoxysilane | 14.8% |
| acetylacetone | 1.5% |
| 5,7-dibromo-8-hydroxyquinoline | 6.8% |
| methoxyethanol | 10.7% |
| DI Water | 4.8% |
| FE1025.66 NFR | 36.7% |
| Total | 100% |

After combining the metal oxide sol and the polymer precursor, additional FE1025.66 NFR, PHT-4 Diol, a flame retardant available from Great Lakes Chemical Corp. of Indianapolis, Ind., Fyrol PCF, a flame retardant available from Akzo Nobel Functional Chemicals LLC of Dobbs Ferry, N.Y., and 1,1-dichlor-1-fluroethane, a blowing agent, are added to the polymer precursor/metal oxide sol mixture to obtain a polyol precursor. The polyol precursor is mixed and a clear solution may be achieved. Heat may be applied to the mixture if necessary to obtain a clear solution. Deionized water then is added to produce a homogeneous polyol precursor.

In an exemplary embodiment of the flame retardant polymer composition of the present invention, the above-described polyol precursor may have the following composition, with each of the components set forth in weight percent of the total polymer precursor/metal oxide sol mixture:

| Component | wt. % |
|---|---|
| metal oxide sol | 38.2% |
| FE1025.66 NFR | 34.4% |
| PHT-4 diol | 11.8% |
| Fyrol PCF | 4.8% |
| 1,1-dichlor-1-fluroethane | 10.3% |
| DI water | 0.5% |
| Total | 100.0% |

After formulation of the polyol precursor, the polyol precursor may be combined with poly(phenyl isocyante) to produce a flame retardant polyurethane composition. In one embodiment of the invention, the polyol precursor and the poly(phenylisocyanate) may be combined in a 1:1 ratio. In another embodiment of the invention, the polyol precursor and the poly(phenylisocyanate) may be combined in a 1:1.4 ratio. It will be appreciated that the polyol precursor and the poly(phenylisocyanate) may be combined in any ratio suitable for producing a polyurethane composition with desired physical and/or chemical characteristics.

While the above example illustrates the formulation of a flame retardant polyurethane foam composition, it will be appreciated that any other suitable flame retardant polymer composition may be formulated. For example, while this embodiment utilized a titanium-based metal oxide precursor, different metal oxide precursors may be used to create any of the polymer materials set forth above. In addition, other multifunctional compounds may be used to formulate the metal oxide sol, and any other suitable commercially available flame retardant constituent(s) may be used to achieve a desired flame retardancy.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A fire retardant polymer composition comprising:

a polymer material comprising polyurethane;

a plurality of monomers of a polycondensed partially hydrolyzed chelated metal oxide precursor; and at least one flame retardant constituent.

2. The fire retardant polymer composition of claim 1, wherein said polymer material further comprises at least one member selected from the group consisting of an acxylic, an unsaturated polyester, a saturated polyester, an ailcyd, a vinyl ester, an epoxy, a phenol, an urea-aldehyde, a polyvinyl aromatic, a maleimide, a polyvinyl halide, a polyolefin, a polyorganosiloxane, an amino resin, a polyamide, a polyimide, a polyetherimide, a polyphenylene sulfide, an aromatic polysulfone, a polyamideimide, a polyesterimide, a polyesteramideimide, a polyvinyl acetal, a fluorinated polymer, and a polycarbonate.

3. The fire retardant polymer composition of claim 1, wherein said polycondensed partially hydrolyzed chelated metal oxide precursor comprises at least one metal selected from the group consisting of a transition metal, an alkaline earth metal and a metallic element from Groups 3A, 4A and 5A of the periodic table of elements.

4. The fire retardant polymer composition of claim 1, wherein said polycondensed partially hydrolyzed chelated metal oxide precursor comprises at least one metal selected from the group consisting of aluminum, antimony, bismuth, calcium, chromium, magnesium, tin, titanium, zinc, and zirconium.

5. The fire retardant polymer composition of claim 1, wherein the polycondensed partially hydrolyzed chelated metal oxide precursor comprises at least one multifunctional compound containing at least one chelating group coordinated to at least one metal selected from the group consisting of an alkaline earth metal, a transition metal, a Group 3A metal, a Group 4A metal and a Group 5A metal.

6. The fire retardant polymer composition of claim 1, wherein the polycondensed partially hydrolyzed chelated metal oxide precursor comprises at least one multifunctional compound selected from the group consisting of alkoxylated diamines, aminoalkylphosphonic acid, amino tris(methylene phosphonic acid), citric acid, diethylenetriamine pentaacetic acid, ethylenediaminetetraacetic acid, gluconic acid, glucoheptonoic acid, hexamethylenediamine tetra(methylene phosphonic acid), 2-(methacxyloyloxy)ethyl acetoacetate, 5-(methaciyloyloxy)methyl salicylic acid, 4-methacryloylamino salicylic acid, hydroxyethyl salicylate, hydroxyethyl salicylamide, 2-(2-hydroxy ethoxy) phenol, o-hydroxybenzoylacetone, 5-hydroxy-2-(hydroxymethyl)-4H-pyran-4-one, N-hydroxyethylenediamineriacetic acid, hydroxyethylidene diphosphonic acid, hydroxyethane diphosphonic acid, nitrilotriacetic acid, sorbitol, tolyltrizole, o-hydroxybenzoylacetone, 2-hydroxydibensoylmetbane, N-(acetaacetyl)glycine, acetylacetone, poly(ethylene glycol) methaciylate, and poly(propylene glycol) metbacrylate.

7. The fire retardant polymer composition of claim 1, wherein the polycondensed partially hydrolyzed chelated metal oxide precursor comprises at least one supplemental multifunctional compound selected from the group consisting of acetylacetone, poly(ethylene glycol) methacrylate, poly(propylene glycol) methacrylate, salicylic acid, 3-hydroxy-2-methyl-4-pyrone, and 8-hydroxyquinolone.

8. The fire retardant polymer composition of claim 1, wherein said at least one flame retardant constituent comprises at least one constituent selected from the group consisting of a halogen-based, a phosphorous-based, a nitrogen-based and a sulfur-based flame retardant.

9. The fire retardant polymer composition of claim 1, further comprising at least one constituent selected from the group consisting of a blowing agent, a fibrous reinforcing material, a pigment, a mold release agent, a thermoplastic polymeric material, an elastomeric polymeric material, a shrink conirol agent, a wetting agent, an antifoam agent, a surface treatment agent, a surface treatment agent, and a thickener.

10. The fire retardant polymer composition of claim 1, wherein said fire retardant polymer composition is transparent.

11. A process for making a flame retardant polymer composition comprising the steps of:

contacting a polymer material comprising polyurethane with a metal oxide sol comprising a liquid and a condensation product of a partially hydrolyzed chelated metal oxide precursor to form a mixture;

contacting said polymer material with at least one flame retardant constituent; and perforn at least one step selected from the group consisting of polymerizing said polymer material and solidifying said polymer material.

12. The process of claim 11, wherein said polymer material further comprises at least one member selected from the group consisting of an acrylic, an unsaturated polyester, a saturated polyester, an alkyd, a vinyl ester, a polyurethane, an epoxy, a phenol, an urea-aldehyde, a polyvinyl aromatic, a maleimide, a polyvinyl halide, a polyolefin, a polyorganosiloxane, an amino resin, a polyamide, a polyimide, a polyetherimide, a polyphenylene sulfide, an aromatic polysulfone, a polyamideimide, a polyesterimide, a polyesteramideimide, a polyvinyl acetal, a fluorinated polymer, and a polycarbonate.

13. The process of claim 11, the process further comprising the step of formulating said metal oxide sol by contacting at least one metal oxide precursor with at least one mutifunctional compound.

14. The process of claim 13, the process further comprising the step of selecting said at least one metal oxide precursor from the group consisting of a transition metal, an alkaline earth metal and a metallic clement from Groups 3A, 4A and 5A of the periodic table of elements.

15. The process of claim 13, the process further comprising the step of selecting said at least one muiltifunctional compound from the group consisting of alkoxylated diamines, aminoalkylphosphonic acid, amino tris(methylene phosphonic acid), citric acid, diethylenetriamine pentaacetic acid, ethylenediaminetetraacetic acid, gluconic acid, glucoheptonoic acid, hexamethylenediamine tetra(methylene phosphonic acid), 2-(metbacryloyloxy)ethyl acetoacetate, 5-(methacryloyloxy)methyl salicylic acid, 4-methacryloylamino salicylic acid, hydroxyethyl salicylate, hyclroxyethyl sallicylamide, 2-(2-hydroxy ethoxy) phenol, o-hydroxybenzoylacetone, 5-hydroxy-2-(hydroxymethyl)-4H-pyran-4-one, N-hydroxyethylenediaminetriacetic acid, hydroxyethylidene diphosphonic acid, hydroxyethane diphosphonic acid, nitrilotriacetic acid, sorbitol, tolyltrizole, o-hydroxybeozoylacetone, 2-hydroxydibensoylinethane, N-(acetoacetyl)glycine, acetylacetone, poly(ethylene glycol) methaczylate, and polyropylene glycol) methaciylate.

16. The process of claim 13, the process further comprising the step of formulating said at least one metal oxide sol by contacting said at least one metal oxide precursor with at least one supplemental multifunctional compound, selected from the group consisting of acetylacetone, poly(ethylene glycol) methacrylate, poly(propylene glycol) methacxylate, salicylic acid, 3-hydroxy-2-methyl-4-pyrone, and 8-hydroxyquinolone.

17. The process of claim 11, the process further comprising the step of removing said liquid from said mixture prior to the step of performing at least one step selected from the group selected from the group consisting of polymerizing and solidifying said polymer material.

18. The process of claim 11, the process further comprising the step of removing said liquid from said mixture after the step of performing at least one step selected from the group selected from the group consisting of polymerizing and solidifying said polymer material.

19. The process of claim 11, wherein said step of combining said mixture with at least one flame retardant constituent comprises selecting said at least one flame retardant constituent from the group consisting of a halogen-based, a phosphorous-based, a nitrogen-based and a sulfur-based flame retardant constituent.

20. The process of claim 11, the process further comprising the step of contacting said mixture with at least one ingredient selected from the group consisting of a blowing agent, a fibrous reinforcing material, a pigment, a mold release agent, a thermoplastic polymeric material, an elastomeric polymeric material, a shrink control agent, a wetting agent, an antifoam agent, a surface treatment agent and a thickener.

21. The process of claim 11, wherein said step of contacting said polymer material with at least one flame retardant constituent is performed after said step of contacting said polymer material with a metal oxide sol.

22. A fire retardant polymer foam composition comprising:

a polymer material comprising polyurethane;

a plurality of monomers of a polycondensed partially hydrolyzed chelated metal oxide precursor, a flame retardant constituent; and a blowing agent.

23. The fire retardant polymer foam composition of claim 22, wherein said partially hydrolyzed chelated metal oxide precursor comprises at least one metal selected from the group consisting of a transition metal, an alkaline earth metal and a metallic element from Groups 3A, 4A and 5A of the periodic table of elements.

24. The fire retardant polymer foam composition of claim 23, wherein said partially hydrolyzed chelated metal oxide precursor comprises at least one metal selected from the group consisting of aluminum, antimony, bismuth, calcium, chromium, magnesium, tin, titanium, zinc and zirconium.

25. The fire retardant polymer foam composition of claim 22, wherein the partially hydrolyzed chelated metal oxide precursor comprises at least one multifunctional compound containing at least one chelating group coordinated to at least one metal selected from the group consisting of an alkaline earth metal, a transition metal, a Group 3A metal, a Group 4A metal and a Group 5A metal.

26. The fire retardant polymer foam composition of claim 22, wherein the partially hydrolyzed chelated metal oxide precursor comprises a multifunctional compound selected from the group consisting of alkoxylated diamines, aminoalkylphosphonic acid, amino tris(methylene phosphonic acid), citric acid, diethylenetriamine pentaacetic acid, ethylenediaminetetraacetic acid, gluconic acid, glucoheptonoic acid, hexamethylenediamine tetra(methylene phosphonic acid), 2-(methacryloyloxy)ethyl acetoacetate, 5-(methacryloyloxy)methyl salicylic acid, 4-methacryloylamino salicylic acid, hydroxyethyl salicylate, hydroxyethyl salicylamide, 2-(2-hydroxy ethoxy) phenol, o-hydroxybenzoylacetone, 5-hydroxy- 2-(hydroxymethyl)-4H-pyran-4-one, N-hydroxyethylenediaminetriacetic acid, hydroxyethylidene diphosphonic acid, hydroxyethane diphosphonic acid, nitrilotriacetic acid, sorbitol, tolyltrizole, o-hydroxybenzoylacetan, 2-hydroxydibensoylmethane, N-(acetoacetyl)glycine, acetylacetone, poly(ethylene glycol) methacrylate, and poly(propylene glycol) methacrylate.

27. The fire retardant polymer foam composition of claim 22, wherein said at least one flame retardant constituent comprises at least one constituent selected from the group consisting of a halogen-based, a phosphorous-based, a nitrogen-based and a sulfur-based flame retardant.

* * * * *